United States Patent [19]

Parkinson, deceased

[11] Patent Number: 5,326,660
[45] Date of Patent: Jul. 5, 1994

[54] ERASABLE OPTICAL RECORDING MEDIA

[75] Inventor: Dean B. Parkinson, deceased, late of Redwood City, Calif., by Elfriede Parkinson, executrix

[73] Assignee: SRI International, Calif.

[21] Appl. No.: 38,368

[22] Filed: Mar. 29, 1993

[51] Int. Cl.$^5$ .......................... G11B 7/00; G11B 7/24; G11B 7/26
[52] U.S. Cl. ........................ 430/19; 430/321; 430/495; 430/945; 430/270; 427/162
[58] Field of Search ................. 430/19, 945, 495, 321, 430/270; 346/135.1; 427/162

[56] References Cited

U.S. PATENT DOCUMENTS

| | | | |
|---|---|---|---|
| 3,476,712 | 11/1969 | Fukui et al. | 528/363 |
| 4,270,130 | 5/1981 | Houle et al. | 430/945 |
| 4,478,782 | 10/1984 | Kuder et al. | 264/345 |
| 4,666,819 | 5/1987 | Elmasry | 430/270 |
| 4,725,525 | 2/1988 | Kenney et al. | 430/270 |
| 4,728,724 | 3/1988 | Jones, Jr. et al. | 430/19 |
| 4,886,718 | 12/1989 | Eich et al. | 430/20 |
| 4,977,064 | 12/1990 | Sukawa et al. | 430/270 |

FOREIGN PATENT DOCUMENTS 60-161195  8/1985  Japan ..................................... 430/19

Primary Examiner—Charles L. Bowers, Jr.
Assistant Examiner—John A. McPherson
Attorney, Agent, or Firm—Burns, Doane, Swecker & Mathis

[57] ABSTRACT

An optical recording structure comprises a thermally stable substrate and a polymeric layer deposited on the substrate comprised of a poly(ester-amide). Laser beams are directed at the deposited polymeric layer to record or erase information. The recording structure has an excellent dimensional and mechanical stability on storage, readily and easily records information, and has an ability to be easily and completely erased.

16 Claims, No Drawings

ERASABLE OPTICAL RECORDING MEDIA

BACKGROUND OF THE INVENTION

1. Field of the invention

The present invention generally relates to optical recording mediums and techniques for recording of information thereon. More particularly, the present invention relates to an information recording medium, preferably in the form of a disk or in tape format, suitable for use with an optical recording and playback apparatus.

2. State of the art

Optical recording methods have been proposed in which light from a laser is focused upon the surface of a recording medium with sufficient intensity to cause a detectable change in the physical characteristics of the surface material. Among these methods is the establishment of an information pattern of pits in the surface an optical medium. In such methods, the information representative pattern of pits can be formed in the surface of the recording medium by suitably controlling the intensity of the focused light in accordance with the information to be recorded while relative motion is established between the recording medium and the focused light spot.

Recently, there have been efforts to develop an information recording method in which information is written in a thin film of metal or the like formed on a substrate by using a laser ray or beam. According to such a method, information recording has been accomplished by forming holes or recesses in metallic thin films under the action of a thermal energy beam such as a laser ray. This method is suggested in, for instance, U.S. Pat. No. 4,238,803.

Dies and pigments have also been employed in information layers of recording media, often to enhance the sensitivity of the recording layers at the particular wavelength of the laser being used. Their use can provide a much sharper recording and playback of the information.

For example, U.S. Pat. No. 4,097,895 describes a recording medium which includes a light reflecting material, such as aluminum or gold, coated with a dye-containing light absorbing layer, such as a fluorescein layer which is operative with an argon laser light source. The thickness of the light absorbing layer is chosen so that the structure has a minimum reflectivity. An incident light beam then ablates, vaporizes or melts the dye-containing light absorbing layer, leaving a hole and exposing the light reflecting layer. After recording at the wavelength of the recording light, maximum contrast between the minimum reflectance of the light absorbing layer and the reflectance of the light reflecting layer exists.

Techniques for erasing the deformation pattern have involved reheating the thermoplastic film above its melting point to a significantly higher temperature than during recording in order to permit surface tension to smooth out the surface. Selective erasure may be accomplished by confining the heating to a selected area. After cooling, another deformation pattern may be recorded in the thermoplastic film.

For instance, U.S. Pat. No. 3,475,760, describes a system for directly recording information in a thermoplastic film as a deformation by using a high energy laser scanning beam of small diameter. The sensitivity of the films for laser film deformation recording can be enhanced by the addition of pigments or dyes which exhibit a high absorption at the laser wavelength. Erasure of the film deformation is accomplished by recording over the information to be erased using a similar laser beam but with a much smaller scan line spacing, preferably to provide overlap of the scan lines.

In a paper entitled "Single Wavelength Optical Recording in Pure, Solvent Coated Infrared Dye Layers" by Gravesteijn, Steenbergen and Van der Veen, experiments on the use of certain dyes for optical recording in digital and video applications at GaAlAs laser wavelengths are reported. The paper was presented at the Proceeding of the SPIE, "Optical Storage Media" Volume 420 Jun. 6–10 1983. The specific dyes discussed in the paper are squarylium dyes and pentamethine dyes. It is disclosed that solubility in organic solvents can be greatly increased by the introduction of t-butyl groups into thiopyrylium end groups. Other U.S. patents which disclose the use of a light absorbing dye in a recording layer include U.S. Pat. Nos. 4,412,231 and 4,446,223.

The use of dyes in conjunction with optical recording media comprising a styrene oligomer is disclosed in an article by Kuroiwa et al. appearing in the Japanese Journal of Applied Physics, Vol 22, No 2, February 1983, pp. 343-348. Among the dyes and pigments discussed as being useful is a copper phthalocyanine pigment. Phase separation and incompatibility between the dyes and oligomers are noted in the article as being problems in the use of dyes for optical information media.

U.S. Pat. No. 4,977,064 describes an optical recording medium of two recording media layers with each layer containing different light sensitive dyes. The two layers have individual specific reflectance, transmittance and absorbance which allows for detection of a variation in the amount of light reflected from the boundary between the two layers.

Various optical recording media have also been investigated. U.S. Pat. No. 4,478,782 describes an optical recording medium of a dimer acid polyamide in which information is recordable and erasable. U.S. Pat. No. 3,574,760 describes thermoplastic films utilized as erasable recording media. Suitable thermoplastic films are disclosed as including vinyltoluenebutadiene, polystyrene orthoterphenyl, polyethylene, and nitrocellulose.

The recording medium, of course, is one of the key elements in any optical recording system in which the information is recorded or read by light. Such a system would have usefulness in the storage of audio and video information, data processing and document processing. The commercial viability of an optical recording medium would depend upon such technical parameters as the sharpness in recording, playback of the information, and the useful life of the information medium. Maintaining the sensitivity of a recording medium throughout the cycles of record-read-erase is also an important consideration.

Although many different media have been investigated for possible use in the various aforementioned recording systems, and in particular the laser systems, a suitable recording medium or disk which is stable and economical, yet readily erasable when desired, has yet to be provided. Such a recording medium, would be readily accepted and would fill the void in the video recording market place. The search for improved, erasable optical recording media is ongoing.

SUMMARY OF THE INVENTION

Generally speaking, the present invention provides a novel erasable recording medium containing a light-sensitive dye which is stable, yet readily and accurately erasable when desired. The erasable recording medium of the present invention is particularly useful for video recordings, which comprises a polymeric layer exhibiting specifically selected properties to render the recording and erasing of information from the recording medium most effective and economic.

In one preferred embodiment, the recording medium of the present invention is intended for use with a recording laser that emits light of a predetermined frequency, wherein the information layer of the recording medium comprises poly(ester-amide). The poly(ester-amides), which are manufactured by reacting bis-oxazines with diacids, exhibit certain specified properties which make them most advantageously employable in erasable information recording media. In particular, the poly(ester-amides) of the present invention are soluble in a wide range of solvents allowing for various simplified coating methods. Moreover, low laser energy is required in formation of the patterns of pits needed for information recording.

Accordingly, the erasable information recording medium of the present invention comprises a multi-layer structure comprised of a relatively thick, thermally stable substrate and a polymeric layer deposited on the substrate comprised of a poly (ester-amide ). Such a multi-layer structure has surprising applicability as an erasable information recording medium as it has excellent dimensional and mechanical stability on storage, readily and easily records information, and yet has an ability to be readily and quickly erased when desired.

It is also preferable that the poly(ester-amide) polymers exhibit a melt viscosity low enough to preclude the possibility of writing during erasure. The poly (ester-amide) polymers should also preferably be capable of forming a thin film and be optically homogeneous and non-scattering upon forming the film, and should adhere well to the substrate.

In a preferred embodiment of the present invention, the information layer comprising the poly(ester-amide) further contains a dye which is absorptive at the light frequency of a predetermined recording light source.

DETAILED DESCRIPTION OF THE PREFERRED EMBODIMENTS

The polymers employed in the erasable optical recording medium of the present invention are poly(ester-amides). These poly(ester-amides) are manufactured by reacting bis-oxazolines with suitable diacids. However, such polymers have not heretofore been recognized as being suitable for use in erasable information recording media.

Poly(ester-amides) may be employed in the recording medium if the polymers exhibit a melt viscosity of less than 5 poise in the temperature range of from about 50° C. to about 160° C., preferably from about 60° C. to about 150° C. and most preferably from about 70° C. to about 140° C. Additionally, the poly(ester-amide) should have a surface tension of at least 15 dynes/cm in the temperature range of about 50° C. to about 160° C.

In general, the suitable poly(ester-amides) exhibit average molecular weight in the range of from about 1,000 to about 100,000, preferably from about 5,000 to about 70,000 and most preferably about 50,000.

Such poly(ester-amides) are surprisingly well suited for use in an erasable optical recording medium due to the polymers exhibiting low melt viscosity. The ratio of surface tension to melt viscosity is believed to signify the capability of a polymer film comprised of the polymer to be erased because the rate of erasure is generally proportional to the surface tension of the polymer and inversely proportional to the melt viscosity of the polymer at the temperature of erasure. By exhibiting the aforementioned surface tension to viscosity ratio, an extremely fast erasure rate can be attained. For example, the erasure note of the present invention includes up to $10^7$ bits/sec. or more. Such a high erasure rate is extremely important for commercial erasable recording media where time is of the essence. Without such a capability for a quick, easy and complete erasure, the technical aspects and hence commercial viability of the product for such application would be adversely affected.

Moreover, the ability of the poly(ester-amides) to have a surface tension of at least 10 dynes/cm and more preferably at least 30 dynes/cm in a low temperature range of from about 50° to about 160° C., and more preferably from about 60° to about 150° C. essentially precludes the possibility of writing during erasure because erasure levelling occurs at a temperature well below the thermal degration temperature. Advantageously, the expenditure of energy for erasure is also of a relatively limited nature due to the capability of erasure of recorded information at such low temperatures. Therefore, low laser energy is required and fewer defects are generated in the recording medium. Yet, the erasure temperature for the recording medium is still thereby sufficiently above normal ambient temperatures that recorded information is not inadvertently erased by levelling upon storage or upon scanning with a low intensity read laser beam.

The poly(ester-amides) are also uniquely suited for use in the writing layer for they generally exhibit a Vicat softening point in the range of from about 25° C. to about 100° C. and preferably about 35° C. to about 85° C. and most preferably from about 45° to about 65° C. Such a Vicat softening point insures that the polymer layer will remain dimensionally stable for normal variations in ambient temperature, and hence provide a permanent record upon storage. The Vicat softening point of particular polymers can be measured in accordance with conventional techniques.

Additionally, the poly(ester-amides) are also essentially insoluble in water so that the polymer layer does not swell in a humid environment. However, the poly(ester-amides) are soluble in a wide range of solvents, allowing for numerous, more simplistic, coating processes such as spin coating to be utilized in depositing the recording medium. The high solvent solubility also increases the adherence of the deposited medium to the substrate. Suitable organic solvents include alcohols and ketones, with the preferable solvent being methanol.

The poly(ester-amides) also exhibit a high temperature of thermal degradation. This yields recording mediums of high stability. For example, the temperature of the onset of thermal degradation as measured by thermogravimetric analysis and defined for use herein is that temperature at which a sample loses 10 percent of its original weight, is at least about 300° C. for the poly(ester-amides) employed in the recording medium. Preferably, the temperature of thermal degradation is at least about 400° C. Therefore, the erasure temperature for the poly(ester-amides) is substantially lower than the thermal degradation temperature. This advantage reduces problems due to incomplete erasure when the temperature of erasure is close to the thermal degradation temperature.

The polymeric recording medium also maintains a substantially defect free composition after undergoing thermal degradation. This allows the recording medium surface to remain free of debris during high temperature treatment sequences to which the recording medium may be subjected. Accordingly, the medium scatters less light and yields a much higher signal-to-noise ratio.

Further, with regard to optical qualities, the poly(ester-amides) are optically homogeneous and do not scatter light. The more optically homogeneous the polymer of a recording layer, the better the resolution and/or information density of the recording medium.

The preparation of the poly(ester-amides) can be carried out by reacting substantially equivalent amounts of bis-oxazolines with diacids at condensation temperatures between about 100° C. and about 300° C. Preferably, the temperature ranges between about 150° and about 250° C. The residual water of condensation can be advantageously removed by applying a vacuum of 10–30 mmHg for 1 to 3 hours. The polymerization is terminated when the desired poly(ester-amide) is obtained.

The diacids used in the production of the poly(ester-amides) can be prepared using conventional techniques. Generally, the diacids can be prepared by ionic, radical or thermal polymerization. The starting materials used in the thermal polymerization process are monoethylenic or polyethylenic carboxylic acids and possibly saturated polyacetylenic or monoacetylenic carboxylic acids. Adipic acid is the most preferable diacid. A catalyst may also be employed in the polymerization process, such as aluminum. The diacids employed in the preparation of the poly(ester-amides) may be a mixture of one or more types of diacids. In particular, the diacid content of the mixture is at least 60–90% by weight with the remainder being triacids and higher polymeric and monomeric acids.

The bis-oxazolines used in the manufacture of poly(ester-amides) of the present invention are available commercially. A mixture of different bis-oxazolines may be used in preparing the poly(ester-amide).

The film formed of the poly(ester-amide) material can be self-supporting, in which case any suitable or conventional coating technique may be used. However, the polymeric material is preferably deposited as a film on a suitable substrate to add dimensional stability thereto. The substrate may be optically featureless or may contain preformed information in the form of pits or grooves. The substrate is made of a thermally stable material, which is also mechanically rigid and dimensionally stable and which ideally has an isotopically low coefficient of thermal expansion. Therefore, the recording medium does not warp during storage, writing, erasure or reading.

The substrate may be opaque, transparent, or highly reflective. Additionally, the polymeric medium must adhere well to the substrate and have a compatible coefficient of thermal expansion. Good adhesion may be defined as the inability to remove the coating from the substrate by means of adhesive tape such as Scotch ® brand tape. Examples of suitable materials for the substrate include ceramics, glass, plastics such as polycarbonate, polymethylmethacrylate and polyacrylates, resins such as phenolic resins, epoxy resins, polyesters, polyimides, polyether sulfones, polyether ketones, polyolefins, polyphenylene sulfide and nylon, as well as metals such as aluminum. Furthermore, the shape and size of the substrate can vary depending upon the application. The shape and format, for example, may be a disk, tape, belt or drum. A disk shape is most preferred.

In order for the recording medium to absorb light at a predetermined wavelength, it is necessary to add a dye of appropriate absorption wavelength to the polymer. Generally, a dye exhibiting strong absorbance of light in the wavelength range of 400–900 mm is preferred. For example, if an argon laser is employed for writing information into the recording medium, an organic dye such as fluorescein, which is highly absorptive at the light frequency of the laser, can be advantageously used. Other dyes which may be used are polymethine dyes, merocyanine dyes, ozanmulene dyes, anthraquinare dyes, napthalendione dyes, dithiol metal complex dyes, diamino metal complex dyes, xanthene dyes, triphenyl methane dyes or mixtures thereof. It is preferred to employ dyes of suitable properties so as not to detrimentally affect the ease with which the recording medium can be recorded upon and erased. The addition of a dye may change the physical properties, such as the melt viscosity of the polymer layer, and care must be taken when selecting an appropriate polymer/die combination. Other additives, such as stabilizers, plasticizers, surfactants, antistatic agents, flame retardants, dispersants, smoothening agents, leveling agents, anti-bleeding agents, antioxidants, water repellents and emulsifiers might also be desirably added to the polymer and their effect, if any, on the properties of the polymer must also be considered.

Because the read, write and erase steps all require operating within a very narrow depth of focus, the film must be applied in a manner which yields extremely flat surfaces to avoid errors and noise. In order to facilitate the coating process, it is advantageous that the dye and polymer be soluble in a wide range of organic solvents, such as alcohols or ketones. Preferably methanol or propanal are employed as solvents. This allows the polymer, the dye and other additives to be mutually soluble which, in turn, yields flat film surfaces. Upon evaporation of the solvent, the dye or other additives should not precipitate in a particulate form because this causes light scattering.

Any suitable coating technique may be utilized to achieve flat film surfaces such as chemical vapor deposition, vacuum deposition or plasma deposition. However, spin coating is the most preferred method, and allows for a high degree of control of film thickness and flatness. Preferred thickness of the recording film are determined by the recording sensitivity of the recording medium. The thickness of the film is within the range of 40–400 mm.

The structure of the recording medium may vary in that the recording film may be coated on one or both sides of the substrate. Alternatively, two substrates having the polymer film on either side can be combined allowing the sides having the polymer films to face each other at a constant distance, the combined substrates being sealed to prevent dust contamination and scratches. The recording structure also can have a sublayer such a metal reflective layer or a layer of various resins on the substrate, with the recording film being coated over it. Additionally, various thermoplastic resins, thermosetting resins, ultra violet or electron beam cured resins may be utilized as sub-layers. A suitable protective layer or encapsulant can also be used, if desired, to protect the recording layer from dirt, dust, scratches or abrasion.

For illustrative purposes, the optical recording device can be operated using a light beam, such as a laser, to write, read and erase desired information. The substrate or disk is rotated at a constant angular velocity while a laser is focused on the polymer surface. The intensity of the light beam is controlled in accordance with the desired information to be recorded. Control of the light intensity is effectuated by picture-representative video signals that vary the light intensity between a high level sufficient to effect ablation of the medium and a low level insufficient to effect such ablation. Preferred writing speeds range from $10^6$–$10^7$ bits per second.

The relative diameter and depth of the pits formed by the ablation will depend not only on the optical and thermal properties of the polymer layer but also on the characteristics of the writing beam such as the focused spot diameter, depth of focus, intensity profile and intensity and duration of the writing pulse. The polymeric material requires a very low intensity light beam within the range of 400 to 900 nm. Preferably a laser, at 830 nm, is the light source. This reduces the levelling or erasure of previously recorded information of adjacent pits during the writing process. It is preferred that the ablation of the polymer film does not proceed to the substrate layer. If ablation is to proceed to the substrate, the substrate material employed is preferably glass, ceramic, or a metallized substrate.

The ablation of the polymeric material in designated areas of the medium forms an information track comprising a succession of spaced its in the polymer surface of the disk. Variations in the length and separation of the pits are representative of the recorded information. The information track may be in either digital or analog form.

The recorded information is retrieved by an optical playback process in which a light beam is focused upon the information track of a rotating recording medium. The playback beam ordinarily has a constant intensity at a level insufficient to effect ablation of the polymer layer or erasure of the recorded information. A photodetector, positioned to receive light reflected from the successive regions of the information track as they pass through the path of the focused light, develops a signal representative of the recorded information.

Several variations in the playback or reading system are possible with the recording medium. The preferred mode of reading information involves the relative reflection between the polymeric material surface and those areas in which pits have been formed in the recordation of information. When the reflectivity of the polymeric material surface is of relatively high reflectivity, the reflectivity in the areas of the pits will be less than in the regions without pits when a beam from the read laser passes thereby. When the relative reflectivity of the polymeric material surface is low as compared to that of the substrate, however, the reflectivity in the areas of the pits will be more than in the regions without pits when a beam from the read laser is focused thereon. Consequently, a written bit can be registered as an increase in reflected intensity.

The particular physical properties exhibited by the polymeric medium enable complete and accurate erasure of recorded information. Erasure of the recorded information is readily carried out by heating the medium to a temperature sufficient to fluidize the polymer film such that the surface is levelled by surface tension forces. The erasure temperature ranges between about 100° to 200° C. and more preferably between about 120° to 150° C. This may be done globally by heating the entire structure in an oven or some other suitable means, or by means of a laser beam whose intensity is intermediate between that of the write beam and read beam. It is generally necessary to heat an area considerably greater than that of a single bit, typically 1 micron in diameter, so that addressable bit-by-bit erasure can be difficult.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. An optical recording structure, for use with a recording laser providing light of a predetermined frequency, comprising a thermally stable substrate having coated thereon, a stable and erasable layer of a polymer recording medium comprising a poly(ester-amide) obtained by the reaction of a bis-oxazoline with a diacid, and a laser-sensitive dye material which is absorptive at the frequency of the recording laser.

2. An optical recording structure according to claim 1, said dye material comprising fluorescein, polymethine or triphenyl methane dyes.

3. An optical recording structure of claim 1, wherein the thickness of the polymer layer is in the range of about 40 to about 500 nm.

4. An optical recording structure of claim 1 having an erasure rate of about $10^5$–$10^7$ bits/sec.

5. A method of fabricating an optical recording structure comprising, depositing a thin polymer layer on a substrate and irradiating the thin polymer layer with a beam of light emitted from a laser to form a pattern of pits in the thin polymer layer in accordance with desired information, the thin polymer layer being comprised of a poly(ester-amide) obtained by the reaction of a bis-oxazoline with a diacid, and a laser-sensitive dye material which is absorptive at the frequency of the laser.

6. A method of claim 5, wherein the poly(ester-amide) has an average molecular weight in the range of from about 5,000 to about 70,000.

7. A method according to claim 5, said dye material comprising fluorescein, polymethine or triphenyl methane dyes.

8. A method of claim 7, wherein the laser-sensitive dye material absorbs light at frequencies ranging from 400 to 900 nm.

9. A method of claim 5, wherein the thickness of the thin polymer layer is in the range of about 40 to about 500 nm.

10. A method of claim 5, wherein the thin polymer layer is formed by spin coating.

11. A method of claim 5, wherein the diacid comprises acidic acid.

12. A method of claim 5, wherein the depth of the pits formed in the thin polymer layer is in the range of about 40 to about 250 nm.

13. A method of claim 5, wherein the information is erased by heating the thin polymer layer to remove the pattern of pits.

14. A method of claim 13, wherein the heating is conducted in the temperature range of from 120° to 150° C.

15. A method of claim 13, wherein a pattern of pits is reformed by irradiating the thin polymer layer with a beam of light emitted from a laser.

16. A method of claim 13, wherein the erasure rate is about $10^5$–$10^7$ bits/sec.